United States Patent [19]

Tsunematsu et al.

[11] Patent Number: 5,750,038
[45] Date of Patent: May 12, 1998

[54] METHOD FOR THE PREPARATION OF ACID-RESISTANT CALCIUM SILICATE

[75] Inventors: Shuji Tsunematsu; Hideo Yamada; Eiichi Abe; Kozo Inoue. all of Tosu, Japan

[73] Assignee: Japan as represented by Director General of Agency of Industrial Science and Technology. Tokyo-to, Japan

[21] Appl. No.: 813,684

[22] Filed: Mar. 7, 1997

Related U.S. Application Data

[62] Division of Ser. No. 345,398, Nov. 21, 1994.

[30] Foreign Application Priority Data

Jan. 17, 1994 [JP] Japan ..................... 6-17912

[51] Int. Cl.$^6$ ............................ B01D 37/02
[52] U.S. Cl. ................. 210/777; 210/778; 423/331
[58] Field of Search ................ 423/331; 210/777, 210/778

[56] References Cited

U.S. PATENT DOCUMENTS

| | | |
|---|---|---|
| 3,136,360 | 6/1964 | Ramos et al. . |
| 3,928,539 | 12/1975 | Satoh et al. . |
| 4,094,150 | 6/1978 | Clarke . |
| 4,162,924 | 7/1979 | Kubo et al. . |
| 5,219,551 | 6/1993 | Terase et al. ............... 423/485 |
| 5,223,153 | 6/1993 | Lawson et al. ............ 210/778 |

*Primary Examiner*—Neil McCarthy
*Attorney, Agent, or Firm*—Wenderoth, Lind & Ponack

[57] ABSTRACT

A novel method is proposed for the preparation of a calcium silicate powder particularly useful as a filter aid in the filtration of an acidic aqueous liquid by virtue of the extremely high acid resistance of the calcium silicate powder. The inventive method comprises a hydrothermal reaction of a blend of a silica-containing material and calcium oxide or hydroxide in a specified molar ratio under specified reaction conditions to form calcium silicate, which is then subjected to a heat treatment at 800°–1200° C. for 0.5–2 hours. An improvement can be obtained in the clarity of the filtrate obtained by the filtration using the calcium silicate powder prepared by the inventive method as a filter aid when the hydrothermal reaction for the preparation thereof is conducted in an aqueous solution of potassium hydroxide in a specified concentration.

6 Claims, No Drawings

METHOD FOR THE PREPARATION OF ACID-RESISTANT CALCIUM SILICATE

This is a divisional application of Ser. No. 08/345,398, filed Nov. 21, 1994.

BACKGROUND OF THE INVENTION

The present invention relates to a method for the preparation of acid-resistant calcium silicate. More particularly, the invention relates to a method for the preparation of calcium silicate having high resistance against acids and particularly useful as a filter aid in the filtration of an acidic aqueous solution or slurry which can be filtered only with difficulties.

It is an established technology to use a filter aid in the filtration of an aqueous solution or slurry containing a small amount of a flocculent or fluffy suspended material readily to cause clogging of the filtering material with an object to improve the efficiency of filtration for obtaining a filtrate of high clarity. Various kinds of filter aid materials are known and used in a wide field of filtration works of which the most conventional is diatomaceous earth to be used as a body-feed added to the solution or slurry to be filtered or as a pre-coating material on the filter paper or filter cloth. Use of diatomaceous earths as a filter aid, however, has several problems and disadvantages. Namely, diatomaceous earths, as a material occurring in nature, widely differ in the properties such as the particle size and particle morphology and the differences reflect on the performance of the diatomaceous earth as a filter aid. Consequently, several problems must be solved in the quality control for the industrial preparation of diatomaceous earth-based filter aids in relation to the steps of pulverization and particle size classification. In addition, the abundance of high-quality diatomaceous earths as a natural resource is not universally high enough so that some countries have a serious problem in the supply of high-quality diatomaceous earths.

In view of the above described problems in the use of a diatomaceous earth as a filter aid, a proposal has been made in recent years for the use of synthetically prepared calcium silicate in the form of a powder. As is known, calcium silicate particles, like diatomaceous earths, have a porous structure and the properties thereof such as the particle diameter and particle morphology can be controlled even without undertaking the steps of pulverization and particle size classification to meet the specific requirements in the use thereof by adequately selecting the reaction conditions in the hydrothermal synthesis. Conventional calcium silicate products as a filter aid, however, have a problem or disadvantage which limits the application field of calcium silicate as a filter aid in respect of the resistance against acid to cause dissolution of the siliceous and/or calciferous constituents in the calcium silicate into the aqueous medium when the calcium silicate is contacted with an acidic solution or acidic medium of the aqueous slurry to cause not only contamination of the filtrate but also a decrease in the efficiency of filtration by using the same.

SUMMARY OF THE INVENTION

The present invention accordingly has an object to provide a novel method for the preparation of calcium silicate in the form of a powder having excellent resistance against acids and suitable for use as a filter aid even for an acidic aqueous solution or slurry without affecting the excellent properties inherent in calcium silicate powders in general.

Thus, the method of the present invention for the preparation of acid-resistant calcium silicate in the form of a powder comprises the steps of:

(a) subjecting a blend of a silica-containing material, of which the content of silica is at least 50% by weight, and a calciferous material, which is preferably calcium oxide or calcium hydroxide, in a $CaO:SiO_2$ mixing ratio in the range from 0.2 to 1.0 by moles to a hydrothermal reaction in an aqueous medium at a temperature in the range from 120° to 190° C. for a length of time in the range from 4 to 12 hours to form calcium silicate;

(b) separating the calcium silicate from the aqueous medium; and (c) subjecting the calcium silicate to a heat treatment at a temperature in the range from 800° to 1200° C. for a length of time in the range from 0.5 to 2 hours.

In particular, it is preferable in the above defined process that the aqueous medium, in which the hydrothermal reaction of the siliceous and calciferous starting materials is conducted, is an aqueous solution of potassium hydroxide in a concentration in the range from 0.01 to 1.0 mole/liter when a still higher clarity of the filtrate is desired.

DETAILED DESCRIPTION OF THE PREFERRED EMBODIMENTS

As is described above, the method of the present invention for the preparation of acid-resistant calcium silicate is basically a method utilizing the hydrothermal reaction of a siliceous and calciferous starting materials but is characterized by the specific conditions of the hydrothermal reaction as well as the subsequent heat treatment of the calcium silicate formed by the hydrothermal reaction. When adequately prepared according to the inventive method, the calcium silicate product is highly acid-resistant and useful as a filter aid in the body-feed filtration or pre-coat filtration of a hardly filtrable aqueous solution or slurry to greatly enhance the efficiency in the solid-liquid separation and to efficiently obtain a filtrate of such a high clarity as not to be obtained by using conventional calcium silicate-based filter aids. The extent of dissolution of the calcium constituent from the calcium silicate in an acidic medium can be controlled by adequately selecting the types and blending proportions of the starting materials and the conditions of the heat treatment. Besides the application as a filter aid, the calcium silicate product prepared according to the inventive method is also useful for the removal or immobilization of fatty acids, colored materials and the like, for example, in foodstuff materials by the mechanism of bonding of those foreign materials with the calcium ions or for the removal or immobilization of heavy metal ions in the liquid wastes of various origins.

Step (a) of the inventive method is for the hydrothermal reaction of a siliceous and calciferous starting materials in an aqueous medium. The siliceous starting material is not particularly limitative provided that the content of silica $SiO_2$ therein is, for example, at least 50% by weight. Examples of suitable siliceous starting materials include silica-based materials such as pulverized quartz and silica stone, ash of rice hulls and the like as well as aluminum silicate-based materials such as fly ash from coal-combustion steam power plant, certain volcanic sands and the like. The particle size of the siliceous starting material is not particularly limitative but desirably should be as fine as possible. On the other hand, the calciferous material, i.e. calcium-supplying material, is preferably calcium hydroxide or calcium oxide which is equivalent to calcium hydroxide because calcium oxide can readily be converted into calcium hydroxide in an aqueous medium.

It is essential that the siliceous and calciferous starting materials to be subjected to the hydrothermal reaction are mixed in a calcium:silicon ratio $CaO:SiO_2$ in the range from 0.2 to 1.0 by moles or, preferably, from 0.4:0.8 by moles. When the $CaO:SiO_2$ molar ratio is too low in the blend, the reaction for the formation of calcium silicate is incomplete and the product would be poor in the performance as a filter aid. When the $CaO:SiO_2$ molar ratio is too high, on the other hand, a substantial amount of the calciferous starting material remains unreacted to be contained in the product of the hydrothermal reaction and is dissolved out into the aqueous medium, in particular, when the aqueous medium is acidic to cause contamination of the aqueous filtrate with calcium ions.

The hydrothermal reaction of the above described starting materials is performed in an aqueous medium, which can be mere water, in which the starting materials are dispersed. The volume of the aqueous medium is not particularly limitative provided that a uniform aqueous slurry of the starting materials can be prepared. It is preferable that the aqueous medium for the hydrothermal reaction is an aqueous solution of potassium hydroxide in a concentration up to 1.0 mole/liter or in the range from 0.01 to 1.0 mole/liter. In this preferable way of the hydrothermal reaction, an influence, in addition to the effect of acceleration of the hydrothermal reaction, is caused on the particle morphology of the calcium silicate product from a platelet-like or strip-like morphology to a fibrous morphology so that a great improvement can be obtained in the efficiency of the product as a filter aid to increase the clarity of the filtrate. Increase of the potassium hydroxide concentration to exceed the above mentioned upper limit has no particular additional advantages in respect of the performance of the product as a filter aid.

The hydrothermal reaction is performed of course in an autoclave at a temperature in the range from 120° to 190° C. or, preferably, from 140° to 180° C. for a length of time of at least 4 hours or, preferably, in the range from 4 to 12 hours. When the reaction temperature is too low or the reaction time is too short, substantial amounts of the starting materials are left as unreacted in the product while increase of the reaction temperature and/or the reaction time to exceed the above mentioned respective upper limits would have no particular additional advantages.

In step (b) of the inventive method, the calcium silicate formed by the hydrothermal reaction is separated from the aqueous medium by a known solid-liquid separation means and the cake of the calcium silicate is, if necessary, washed with deionized water, before drying, to be freed from any water-soluble materials which may cause contamination of the filtrate obtained by using the calcium silicate powder as a filter aid.

Step (c) of the inventive method is a heat treatment or calcination of the above obtained calcium silicate powder, which is undertaken with an object to cause a modification in the crystalline structure of the calcium silicate by which the solubility of the calcium silicate in an acidic medium can be substantially decreased. The heat treatment is performed at a temperature in the range from 800° to 1200° C. or, preferably, from 1000° to 1200° C. for a length of time of at least 0.5 hour or in the range from 0.5 to 2 hours. When the temperature of the heat treatment is too low or the length of time thereof is too short, the desired insolubilizing effect on the calcium silicate product would be insufficient. Extension of the time of the heat treatment to exceed the above mentioned upper limit has no particular additional advantages. When the temperature is too high, on the other hand, a change is caused in the particle morphology of the calcium silicate particles resulting in a decrease in the performance thereof as a filter aid although the insolubilizing effect in an acidic medium can be further increased by increasing the temperature of the heat treatment to exceed the upper limit.

In the following, examples and comparative examples are given to illustrate, in more detail, the procedure for the preparation of an acid-resistant calcium silicate powder and evaluation thereof as a filter aid. The calcium silicate products obtained in the following examples and comparative examples were evaluated for the following testing items by the testing procedures described there.

Resistance against acidic medium:

A 0.15 g portion of the calcium silicate powder was added to 200 ml of an aqueous hydrochloric acid solution having a pH of 2 or 3 and agitated at 30° C. for 1 hour followed by centrifugal separation to give a clear supernatant of which the contents of $SiO_2$ and CaO were determined by the atomic absorption spectrophotometric analysis to record the results in mg of the amounts of $SiO_2$ and CaO dissolved out from 1 g of the calcium silicate powder. The results of this test are summarized in Table 1, which also includes the results obtained with a diatomaceous earth sold on the market as a filter aid.

Average particle diameter:

Measurements were performed with an automatic centrifugation instrument for the determination of particle size distribution. The results of this test are summarized in Table 1, which also includes the value of a diatomaceous earth sold on the market as a filter aid.

Ruth's constant-pressure filtration coefficient:

The Ruth's constant-pressure filtration coefficient at 20° C., i.e. $K_{20}$, in $cm^2$/second was determined by using a pressurizable filter having a filtration area of 19.3 $cm^2$ through which an aqueous slurry of "gairome" clay with admixture of the filter aid as a body feed in a F:C ratio, i.e. volume ratio of (filter aid):(clay), of 0.3 or 0.5 to give a total solid content of the slurry of 5 g/liter was filtered under a filtration pressure of 0.5 $kgf/cm^2$. The results of this test are summarized in Table 2, which also includes the results obtained with a diatomaceous earth sold on the market as a filter aid.

Clarity of filtrate:

Transmission of light in % through the filtrate was measured by using a spectrophotometer at a wavelength of 450 nm taking the value through distilled water as 100% and the value when the light beam was completely shielded as 0%. The filtrate was that obtained in the test for the constant-pressure filtration coefficient described above with the F:C ratio of 0.3. Measurements were performed after standing of the filtrate as obtained for 4 minutes at 20° C. The results of this test are summarized in Table 2, which also includes the result obtained with a diatomaceous earth sold on the market as a filter aid.

EXAMPLE 1.

A calcium silicate powder to be subjected to the above described testing procedures was prepared from a reagent-grade precipitated silicon dioxide powder and calcium oxide obtained by the calcination of reagent-grade calcium carbonate at 1000° C. for 4 hours. Thus, these starting materials were blended in a $CaO:SiO_2$ molar ratio of 0.8 and the powder blend was admixed with 20 times by weight of deionized water to give a slurry which was subjected to a hydrothermal reaction in an autoclave at 180° C. for 8 hours with agitation to give an aqueous slurry of calcium silicate particles. The aqueous slurry taken out of the autoclave was filtered and the precipitates of calcium silicate were dried by heating at 120° C. for 8 hours followed by a heat treatment in an electric furnace at 1100° C. for 1 hour to give a calcium silicate powder.

EXAMPLE 2.

The procedure for the preparation of a calcium silicate powder and the testing procedures were substantially the same as in Example 1 except that the starting materials were blended in a $CaO:SiO_2$ molar ratio of 0.6 instead of 0.8.

EXAMPLE 3.

The procedure for the preparation of a calcium silicate powder and the testing procedures were substantially the same as in Example 2 except that the temperature of the heat treatment of the calcium silicate particles obtained by autoclaving was 1000° C. instead of 1100° C.

EXAMPLE 4.

The procedure for the preparation of a calcium silicate powder and the testing procedures were substantially the same as in Example 1 except that the starting materials were blended in a $CaO:SiO_2$ molar ratio of 0.4 instead of 0.8.

EXAMPLE 5.

The procedure for the preparation of a calcium silicate powder and the testing procedures were substantially the same as in Example 3 except that the water as the aqueous medium for the hydrothermal reaction was replaced with the same amount of a 0.1-normal aqueous solution of potassium hydroxide. As is clear from the data given in Table 2, a substantial improvement could be obtained over Example 3 in the clarity of the filtrate obtained in the filtration test although no particular improvement could be obtained in other testing items by the use of the potassium hydroxide solution as the medium of the hydrothermal reaction.

Comparative Examples 1 to 3.

The sample of the calcium silicate tested in each of Comparative Examples 1, 2 and 3 was that prepared in Examples 1, 2 and 4, respectively, but before the heat treatment at 1100° C. for 1 hour. As is understood from the results of testing, the improvement obtained by the heat treatment is most remarkable in the acid resistance of the calcium silicate powders.

TABLE 1

| | Acid-resistance test, mg/g of dissolved amount, at | | | | Average particle diameter, μm |
|---|---|---|---|---|---|
| | pH = 2 | | pH = 3 | | |
| | CaO | $SiO_2$ | CaO | $SiO_2$ | |
| Example 1 | 19.10 | 11.35 | 16.31 | 8.72 | 6.32 |
| Example 2 | 4.83 | 0.71 | 1.81 | 0.63 | 6.29 |
| Example 3 | 5.87 | 1.23 | 4.42 | 1.20 | 6.28 |
| Example 4 | 3.29 | 1.03 | 1.64 | 0.66 | 9.52 |
| Example 5 | 8.42 | 2.13 | 5.51 | 1.64 | 6.14 |
| Comparative Example 1 | 366.29 | 110.93 | 323.82 | 51.98 | 6.95 |
| Comparative Example 2 | 199.30 | 71.97 | 121.40 | 24.50 | 6.69 |
| Comparative Example 3 | 175.58 | 58.85 | 127.64 | 29.18 | 9.94 |
| diatomaceous earth | — | 1.62 | — | 0.99 | 8.47 |

TABLE 2

| | Ruth's constant-pressure filtration coefficient $K_{20}$, $cm^2$/second | | Clarity of filtrate, % |
|---|---|---|---|
| | F:C ratio | | |
| | 0.3 | 0.5 | |
| Example 1 | 0.1040 | 0.1091 | 95.8 |
| Example 2 | 0.0575 | 0.0766 | 90.0 |
| Example 3 | 0.0900 | 0.1774 | 88.0 |
| Example 4 | 0.0585 | 0.0724 | 94.1 |
| Example 5 | 0.0654 | 0.0921 | 98.2 |
| Comparative Example 1 | 0.1223 | 0.4734 | 98.6 |
| Comparative Example 2 | 0.1247 | 0.9712 | 97.8 |
| Comparative Example 3 | 0.1452 | 0.7896 | 96.9 |
| diatomaceous earth | 0.0207 | 0.0375 | 82.4 |

What is claimed is:

1. A method for the filtration of an aqueous acidic solution or slurry which comprises employing, as a filter aid, an acid-resistant calcium silicate in the form of a powder produced by a process which comprises the steps of:

(a) subjecting a blend of a silica-containing material, of which the content of silica is at least 50% by weight, and a calciferous material, with the ratio of calcium in the calciferous material, calculated as CaO, to silicon in the silica-containing material, calculated as $SiO_2$ ($CaO:SiO_2$), in the ratio from 0.4 to 0.8 as moles, to a hydrothermal reaction in an aqueous medium at a temperature in the range from 120° to 190° C. for a length of time in the range from 4 to 12 hours to form calcium silicate;

(b) separating the calcium silicate from the aqueous medium; and (c) subjecting the calcium silicate to a heat treatment at a temperature in the range from 800° to 1200° C. for a length of time in the range 0.5 to 2 hours.

2. The method for filtration according to claim 1, wherein the calciferous material is calcium oxide or calcium hydroxide.

3. The method for filtration according to claim 1, wherein the aqueous medium is water.

4. The method for filtration according to claim 1, wherein the aqueous medium is an aqueous solution of potassium hydroxide in a concentration in the range of from 0.01-normal to 1-normal.

5. The method for filtration according to claim 1, wherein said acid-resistant calcium silicate is employed as a body feed in a body feed filtration.

6. The method for filtration according to claim 1, wherein said acid resistant is employed as a pre-coat in a pre-coat filtration.

* * * * *